(12) United States Patent
Cho

(10) Patent No.: US 12,467,854 B1
(45) Date of Patent: Nov. 11, 2025

(54) OPTICAL PROBE DEVICE FOR ANALYZING COMPONENT OF UNDERWATER SUBSTANCE AND METHOD OF ANALYZING COMPONENT OF UNDERWATER SUBSTANCE BY USING THE SAME

(71) Applicant: Answeray Inc., Gwacheon-si (KR)

(72) Inventor: Seong Ho Cho, Gwacheon-si (KR)

(73) Assignee: ANSWERAY INC., Gwacheon-si (KR)

( * ) Notice: Subject to any disclaimer, the term of this patent is extended or adjusted under 35 U.S.C. 154(b) by 0 days.

(21) Appl. No.: 19/006,664

(22) Filed: Dec. 31, 2024

(30) Foreign Application Priority Data

Sep. 19, 2024 (KR) .................. 10-2024-0126448

(51) Int. Cl.
*G01N 21/31* (2006.01)

(52) U.S. Cl.
CPC ..... *G01N 21/31* (2013.01); *G01N 2201/0212* (2013.01); *G01N 2201/022* (2013.01); *G01N 2201/0633* (2013.01)

(58) Field of Classification Search
CPC .......... G01N 21/31; G01N 2201/0212; G01N 2201/022; G01N 2201/0633
See application file for complete search history.

(56) References Cited

U.S. PATENT DOCUMENTS 11,946,803 B1  4/2024  Cho

FOREIGN PATENT DOCUMENTS

| JP | H05133889 | A |   | 5/1993  |          |
|----|-----------|---|---|---------|----------|
| JP | 3031778   | U |   | 12/1996 |          |
| JP | 2000121548| A |   | 4/2000  |          |
| JP | 2008261770| A |   | 10/2008 |          |
| KR | 20140046313| A|   | 4/2014  |          |
| KR | 20140062776| A|   | 5/2014  |          |
| KR | 20160137019| A|   | 11/2016 |          |
| KR | 20170054631| A|   | 5/2017  |          |
| KR | 101963604 | B1|   | 3/2019  |          |
| KR | 102535460 | B1| * | 5/2023  | ............ G01N 21/65 |
| KR | 102595661 | B1|   | 10/2023 |          |

(Continued)

OTHER PUBLICATIONS

Korean Office Action dated Nov. 13, 2024 issued in KR 10-2024-0126448.

(Continued)

*Primary Examiner* — Jamil Ahmed
(74) *Attorney, Agent, or Firm* — Scully, Scott, Murphy & Presser, P.C.

(57) ABSTRACT

Disclosed is an optical probe device for analyzing a component of an underwater substance, the optical probe device including: a light source unit for emitting excitation light; a sensing unit for emitting the excitation light into underwater and collecting scattered light scattered from the underwater; a spectroscopy unit for analyzing the scattered light; a light transmitting unit for connecting the light source unit and the sensing unit, and the sensing unit and the spectroscopy unit; and a cap having an opening on one side, configured to receive the sensing unit therein, and configured to allow an air layer inside the opening to separate the sensing unit from an underwater environment when the opening is lowered and submerged in the underwater in the state where the opening is disposed to cover a water surface.

12 Claims, 8 Drawing Sheets

(56) References Cited

FOREIGN PATENT DOCUMENTS

KR 102637648 B1 2/2024
WO WO-2022211168 A1 * 10/2022 ............. G01N 33/18

OTHER PUBLICATIONS

Office Action dated Apr. 9, 2025 received in Korean Patent Application No. 10-2024-0126448.
Office Action dated Aug. 19, 2025 received in Japanese Patent Application No. 2025-094888.

* cited by examiner

OPTICAL PROBE DEVICE FOR ANALYZING COMPONENT OF UNDERWATER SUBSTANCE AND METHOD OF ANALYZING COMPONENT OF UNDERWATER SUBSTANCE BY USING THE SAME

CROSS REFERENCE TO RELATED APPLICATION

The present application claims priority to Korean Patent Application No. 10-2024-0126448, filed on Sep. 19, 2024, the entire contents of which is incorporated herein for all purposes by this reference.

BACKGROUND

Field

The present invention relates to an optical probe device for analyzing components of substances present in water within an underwater environment, and a method for analyzing a component of an underwater substance by using the same.

Description of the Related Art

When components of substances present in underwater are analyzed, it is common to use an optical probe provided with a sensing unit. However, when the optical probe is used underwater, there is a problem in that suspended substances, such as organic carbon, in water adhere to the optical system or glass window of the sensing unit having focusing optics and interfere with sensing.

As a solution to this problem, conventional methods have been adopted to wipe the glass windows with mini-wipers, but the conventional technology is difficult to clean the glass window accurately in the case of highly contaminated materials, and manual cleaning is not possible, especially for unmanned and remotely operated monitoring systems, so a new solution is needed.

Therefore, it is necessary to propose a new concept of optical probe that prevents contamination of the optical probe glass window. Conventional optical probes are similarly disclosed as the related arts in U.S. patent Ser. No. 11/946,803, Korean Patent No. 10-2595661, and Korean Patent No. 10-2637648.

PATENT DOCUMENT

Patent Document 1: U.S. patent Ser. No. 11/946,803 (registered on Apr. 2, 2024)
Patent Document 2: Korean Patent No. 10-2595661 (registered on Oct. 25, 2023)
Patent Document 3: Korean Patent No. 10-2637648 (registered on Feb. 13, 2024)

SUMMARY

The present invention has been made in an effort to provide an optical probe device capable of separating a sensing unit from an underwater environment to prevent contamination of the sensing unit when analyzing a component of an underwater substance, and a method for analyzing a component of an underwater substance by using the same.

The present invention has been made in an effort to provide a structure capable of stably separating a sensing unit from an underwater environment even in the underwater environment above a certain depth to prevent contamination of the sensing unit.

An exemplary embodiment of the present invention provides an optical probe device for analyzing a component of an underwater substance, the optical probe device including: a light source unit for emitting excitation light; a sensing unit for emitting the excitation light into underwater and collecting scattered light scattered from the underwater; a spectroscopy unit for analyzing the scattered light; a light transmitting unit for connecting the light source unit and the sensing unit, and the sensing unit and the spectroscopy unit; and a cap having an opening on one side, configured to receive the sensing unit therein, and configured to allow an air layer inside the opening to separate the sensing unit from an underwater environment when the opening is lowered and submerged in the underwater in the state where the opening is disposed to cover a water surface.

The sensing unit may include: a collimator configured to convert the excitation light into parallel light, and to collect the scattered light; and a focusing optics disposed in front of the collimator and configured to collect the parallel light converted by the collimator and to convert the scattered light scattered in the underwater into parallel light.

An edge of the cap defining the opening may be located between the focusing optics and a focal point focused by the focusing optics.

The optical probe device may further include an air injection device connected to the cap and configured to inject air into an inside of the cap.

The optical probe device may further include a first moisture detection sensor spaced inwardly from a distal end of the cap protruding forwardly from the focusing optics by a preset distance to detect water that has filled the inside of the cap, in which the air injection device may be configured to inject air according to a first set value when moisture is detected by the first moisture detection sensor.

The optical probe device may further include a second moisture detection sensor provided on an inner wall of the cap positioned between the focusing optics and the first moisture detection sensor and configured to detect water filled a water level above at which the first moisture detection sensor is positioned or more, in which the air injection device may be configured to inject air according to a second set value greater than the first set value when moisture is detected by the second moisture detection sensor, and the first set value and the second set value may include at least one of an air injection volume and an injection time.

The optical probe device may further include a moisture detection sensor disposed at a front end of the sensing unit positioned in front of the focusing optics and configured to detect moisture, in which the air injection device may inject air when moisture is detected by the moisture detection sensor.

The optical probe device may further include a shutter installed on the cap and configured to open and close an opening in the cap, in which the shutter may be configured to remain closed to trap an air layer inside the cap before being submerged underwater, and to open after being submerged underwater and reaching a target point.

The optical probe device may further include: a water pressure detection sensor installed in the cap and configured to detect water pressure; and an air injection device connected to the cap and configured to inject air into the inside of the cap before the shutter is opened when a water pressure detected by the water pressure detection sensor is greater than a preset value.

The optical probe device may further include: a third moisture detection sensor provided at a distal end of the cap and configured to detect whether the cap has been in contact with a water surface, in which the sensing unit may rise by a preset distance to detect a substance on the water surface when the third moisture detection sensor detects that the cap is in contact with the water surface.

The plurality of sensing units may be provided, and focal points focused through the plurality of the sensing units may be different so that each of the plurality of sensing units analyzes components of underwater substances for different points within a predetermined region corresponding to the cap.

The plurality of sensing units may be provided, and focal points focused through the at least two sensing units may be the same so that each of the two of sensing units analyzes components of underwater substances for the same one point.

Another exemplary embodiment of the present invention provides a method of performing a component analysis of an underwater substance by using the optical probe device.

Still another exemplary embodiment of the present invention provides an optical probe system for analyzing a component of an underwater substance, the optical probe system including: the optical probe device, configured to perform a component analysis of an underwater substance; and a lifting device for moving the optical probe device up and down to take the optical probe device out of the water and then submerge the optical probe device in underwater.

The lifting device may rise by a preset distance such that the sensing unit detects a substance on a water surface when the water surface is detected by the first moisture detection sensor, and the sensing unit may be submerged in underwater and is lowered to reach a target point after detecting the substance on the water surface.

Yet another exemplary embodiment of the present invention provides a method of performing a component analysis of an underwater substance by using the optical probe system.

The effects of the present invention obtained by the above-described solution are as follows.

According to the present invention, when the opening of the cap is arranged to cover the surface of the water and is lowered and submerged underwater, the air layer inside separates the sensing unit received inside the cap from the underwater environment. Thus, when analyzing the component of the underwater substance, the sensing unit is separated from the underwater environment, so that contamination of the sensing unit is prevented. As a result, the analysis of the component of the underwater substance may be performed more precisely and conveniently.

Furthermore, according to the present invention, when the water pressure detected by the water pressure detection sensor is greater than a preset value, the air injection device may be arranged to inject air into the inside of the cap. Accordingly, when the optical probe device is submerged beyond a certain depth, water pressure increases and air is compressed, so that the sensing unit may be prevented from being contaminated.

DETAILED DESCRIPTION OF EMBODIMENTS

Figure 1:
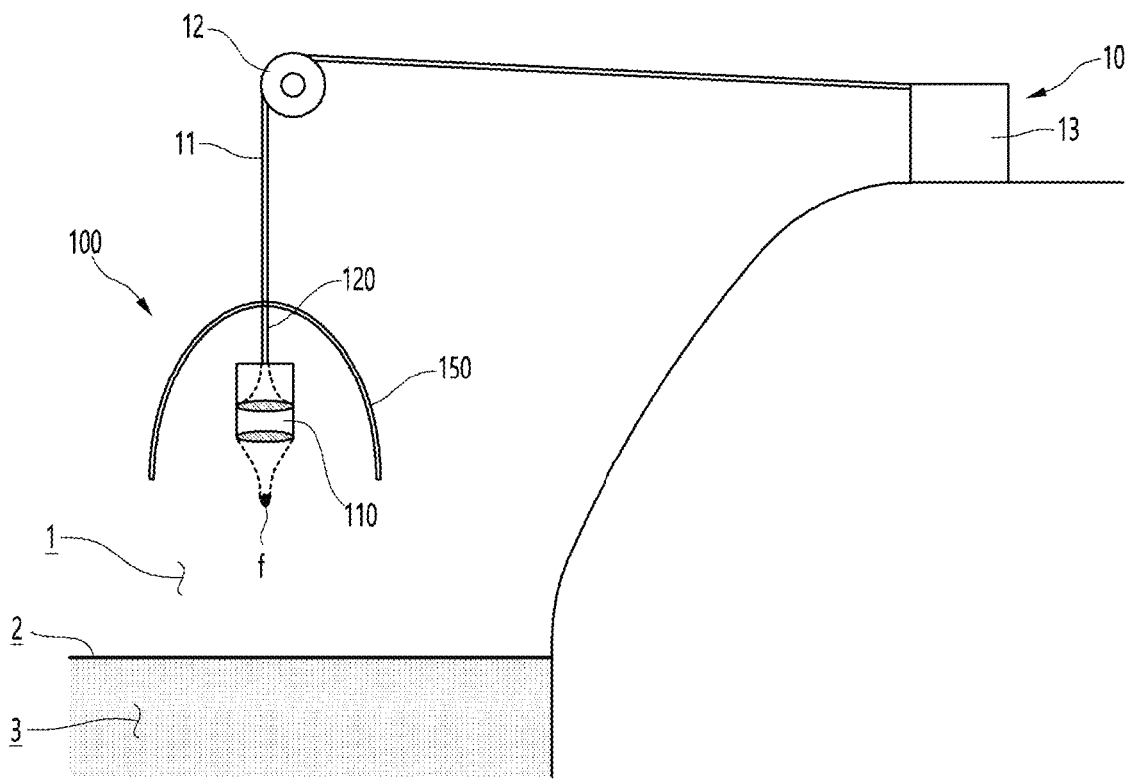
FIG. 1 is a conceptual diagram of an optical probe system including a lifting device.

Hereinafter, an exemplary embodiment disclosed in the present specification will be described in detail with reference to the accompanying drawings, and the same or similar constituent element is denoted by the same or similar reference numeral, and a repeated description thereof will be omitted. Suffixes, "module" and "~unit" for a constituent element used for the description below are given or mixed in consideration of only easiness of the writing of the specification, and the suffix itself does not have a discriminated meaning or role. Further, in describing the exemplary embodiment disclosed in the present disclosure, when it is determined that detailed description relating to well-known functions or configurations may make the subject matter of the exemplary embodiment disclosed in the present disclosure ambiguous, the detailed description will be omitted. Further, the accompanying drawings are provided for helping to easily understand exemplary embodiments disclosed in the present specification, and the technical spirit disclosed in the present specification is not limited by the accompanying drawings, and it will be appreciated that the present invention includes all of the modifications, equivalent matters, and substitutes included in the spirit and the technical scope of the present invention.

Terms including an ordinary number, such as first and second, are used for describing various constituent elements, but the constituent elements are not limited by the terms. The terms are used only to discriminate one constituent element from another constituent element.

It should be understood that when one constituent element referred to as being "coupled to" or "connected to" another constituent element, one constituent element may be directly coupled to or connected to the other constituent element, but intervening elements may also be present. By contrast, when one constituent element is referred to as being "directly coupled to" or "directly connected to" another constituent element, it should be understood that there are no intervening elements.

Singular expressions used herein include plurals expressions unless they have definitely opposite meanings in the context.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

The lenses included in components, such as a sensing unit 110, may be replaced by mirrors. That is, a convex lens may be replaced by a concave mirror, and a concave lens may be replaced by a convex mirror. FIG. 1 is a diagram illustrating an optical probe device 100 including a lifting device 10. As illustrated in FIG. 1, the optical probe device 100 may be moved in an up and down direction, such as being submerged in underwater 3 or being taken out of the underwater 3 and moved into the atmosphere 1 by the lifting device 10. In this case, the up and down direction is referred to as the up direction for the direction facing the atmosphere 1 relative to a water surface 2 and the down direction for the direction facing the underwater 3 relative to the water surface 2, and the up direction and the down direction are independent of the direction of travel of the light transmitted from a light source unit 130.

The lifting device 10 may include a cable 11, a pulley 12 and a drum 13. One end of the cable 11 may be coupled to the optical probe device 100 and the other end may be coupled to the drum 13. Depending on the length of the cable 11, the position of the optical probe device 100 coupled to one end of the cable 11 may vary to air 1 or underwater 3 (target volume). The pulley 12 may guide the movement position of the cable 11, and the drum 13 may be formed with semicircular grooves to wind and unwind the cable 11. At this time, the length of the cable 11 may be automatically adjusted by supplying electricity to the drum 13, or the length of the cable 11 may be easily adjusted by attaching a handle to the drum 13.

The cable 11 may be coupled with an air injection line 161 configured to inject air to the cap 150, and the air injection line 161 may be coupled to an air injection device 160 installed on the exterior of the cap 150.

Figure 2:
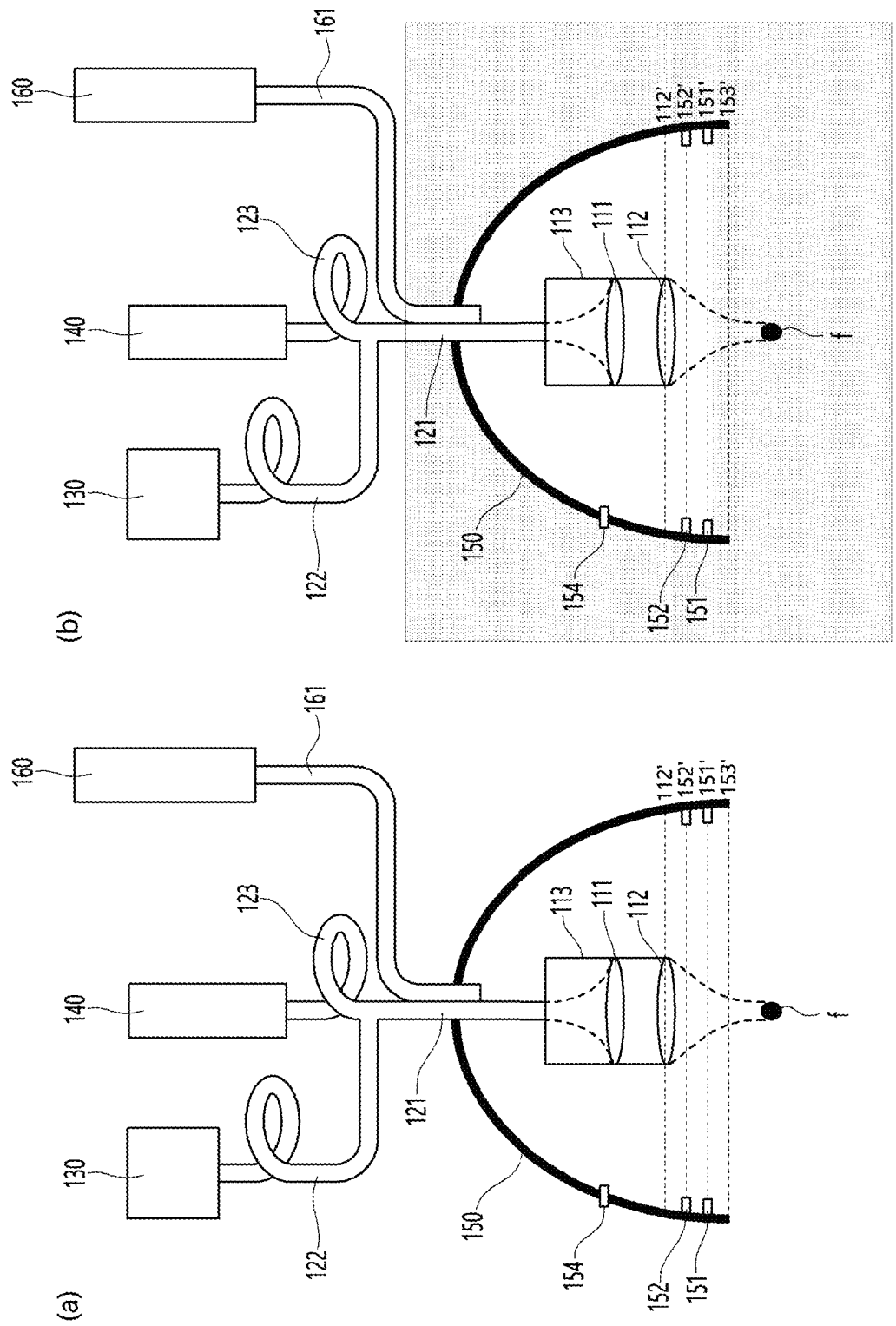
FIG. 2 is a conceptual diagram illustrating an optical probe device.

FIG. 2 is a conceptual diagram illustrating the optical probe device 100. As illustrated in FIG. 2, the optical probe device 100 includes a light source unit 130 that emits excitation light, a sensing unit 110 that emits the excitation light into the underwater 3 and collects scattered light scattered from the underwater 3, a spectroscopy unit 140 configured to analyze the scattered light, a light transmitting unit 120 that connects the light source unit 130 and the sensing unit 110, and the sensing unit 110 and the spectroscopy unit 140, and a cap 150 that has an opening on one side and is configured to receive the sensing unit 110 therein, wherein when the cap 150 is lowered in the state where the opening is arranged to cover the water surface 2 and is submerged in the underwater 3, an air layer inside thereof separates the sensing unit 110 from the underwater 3 environment.

Here, the light source unit 130 emits excitation light, and the excitation light emitted by the light source unit 130 is incident on the light transmitting unit 120 and transmitted through the light transmitting unit 120, and the transmitted excitation light may be incident on the sensing unit 110.

The sensing unit 110 may include a collimator 111 configured to convert the excitation light into parallel light and to collect scattered light, and a focusing optics 112 disposed in front of the collimator 111 to collect the parallel light converted by the collimator 111 and to convert the scattered light scattered from the underwater 3 into parallel light. In this case, the front and the rear are described relative to the direction of travel of the light transmitted from the light source unit 130, and the direction in which the incident light is traveling will be referred to as the front.

The collimator 111 and the focusing optics 112 may be fixed by a sensing housing 113, and the sensing housing 113 may be coupled to the light transmitting unit 120. This allows the excitation light incident from the light transmitting unit 120 to be incident on the collimator 111.

The sensing housing 113 may be shaped to surround the collimator 111 and the focusing optics 112 to fix the position of the collimator 111 and the focusing optics 112. The shape of the sensing housing 113 may vary depending on the shape of the collimator 111 and the focusing optics 112. Herein, in FIGS. 1 to 8, the dotted lines connected with the inside and outside of the sensing housing 113 may represent the travel of light, and the end of the dotted line extending downwardly from the focusing optics 112 may represent a focal point f of the sensing unit 110.

The collimator 111 and the focusing optics 112 may form a coating layer to prevent surface contamination. The coating layer may be formed by hydrophilic coating, which may reduce the size of water droplets generated on the surface, making the surface smoother and facilitating better absorption and penetration of water into the surface. As a result, even when the underwater 3 environment is turbulent, water droplets may evenly spread over=the surface of the sensing unit 110 without lingering on the surface of the sensing unit 110, thereby preventing contamination of the sensing unit 110 and protecting the surface.

In addition, it is advantageous that oil-containing contaminants do not easily adhere to the hydrophilic surface.

Excitation light received by the sensing unit 110 may be converted to parallel light by the collimator 111, and the parallel light may be collected by the focusing optics 112 and emitted into the underwater 3. The emitted collected light may then be scattered in the underwater 3 and converted to scattered light, at least a portion of the scattered light may be incident on the focusing optics 112 and converted to parallel light, the parallel light may be collected by the collimator 111, and the collected parallel light may be transmitted by the light transmitting unit 120 and transmitted to the spectroscopy unit 140.

The spectroscopy unit 140 may spectralize the scattered light by converting the scattered light received by the spectroscopy unit 140 into an electrical signal.

In one exemplary embodiment, the spectroscopy unit 140 generates pre-diffraction radiation generated by scattered light from a test sample at the front of the diffraction grating, allows the pre-diffraction radiation to pass through the diffraction grating to generate post-diffraction radiation at the rear of the diffraction grating, and analyzes the test sample through the post-diffraction radiation.

The spectroscopy unit 140 may include a slit part (not illustrated) and a collimating member (not illustrated) arranged sequentially along a path of the pre-diffraction radiation, a focusing member (not illustrated) and a detection unit (not illustrated) arranged sequentially along a path of the post-diffraction radiation, and a diffraction grating (not illustrated) positioned between the collimating member and the focusing member.

The slit part, the collimating member, the diffraction grating, and the focusing member may be seated on a single plane and spaced apart from each other by a preset distance, the diffraction grating may have a plurality of openings in a polygonal plate shape formed between the pre-diffraction radiation and the post-diffraction radiation in the single plane, and the detection unit may be spaced apart from the single plane and positioned above the diffraction grating, and may be formed to cover the diffraction grating along the topmost surface of the diffraction grating when viewed from the above of the detection unit.

On the other hand, the diffraction grating and the focusing member may be seated on a perpendicular plane to the slit part and the collimating member rather than in-plane, as in Patent Document 3, to enable high-resolution spectroscopy.

The light transmitting unit 120 may be formed from an optical fiber, and the optical fiber may have a core with a high refractive index disposed in the inner side and a cladding with a low refractive index on an outer side and formed to wrap around the core to transmit light with low loss.

In one exemplary embodiment, the light transmitting unit 120 may include a transmission optical fiber 121 having one end coupled to the sensing unit 110 and the other end formed to branch in a Y-branch shape, a light source optical fiber 122 that branches in one direction from the other end of the transmission optical fiber 121, and a spectroscopic optical fiber that branches in the other direction from the other end of the transmission optical fiber 121.

Excitation light emitted by the light source unit 130 may be transmitted in one direction from the other end of the light source optical fiber 122 and then transmitted from the light source optical fiber 122 to the transmission optical fiber 121. The light incident on the transmission optical fiber 121 may be transmitted in the direction from the other end to the one end of the transmission optical fiber 121 and received by the sensing unit 110. The light incident on the sensing unit 110 may be emitted into the underwater 3, and the light may be scattered in the underwater 3 and the scattered light may be incident on the sensing unit 110.

The scattered light transmitted from the sensing unit 110 may be transmitted in the direction from the one end to the other end of the transmission optical fiber 121 and simultaneously transmitted to the light source optical fiber 122 and the spectroscopic optical fiber 123. In this case, a filter may be provided at branch points at which the scattered light is branched from the transmission optical fiber 121 to the light source optical fiber 122 and the spectroscopic optical fiber 123, and the scattered light transmitted from the transmission optical fiber 121 by the filters may be transmitted only to the spectroscopic optical fiber 123 without being branched to the light source optical fiber 122.

In another exemplary embodiment, the light transmitting unit 120 may include a light source optical fiber 122 having one end coupled to the sensing unit 110 and the other end coupled to the light source unit 130 and a transmission optical fiber 121 having one end coupled to the sensing unit 110 and the other end coupled to the spectroscopy unit 140, and the one end of each of the light source fiber 122 and the transmission optical fiber 121 may be formed by being simultaneously wrapped with a single cladding.

When the optical probe device 100 is Raman spectroscopic, a bandpass filter may be installed in the light source optical fiber 122, which is the optical fiber at the light source unit 130 side by separating the sensing unit 110 connected to the light source unit 130 and the spectroscopy unit 140, and a longpass filter may be installed on the spectroscopic optical fiber 123, which is the optical fiber at the spectroscopy unit 140 side. In this case, the bandpass filter and the longpass filter may be disposed between the collimator 111 and the focusing optics 112.

The bandpass filter is an optical filter that allows light to pass in a specific wavelength range or band while blocking other wavelength ranges, while the longpass filter is an optical filter that absorbs or reflects short wavelengths and allows light of long wavelengths to pass.

As a result, when scattered light is generated and introduced, the scattered light is converted to parallel light by the focusing optics 112 and transmitted in the direction of the light transmitting unit 120, the bandpass filter prevents specific wavelengths of light from passing through the light source unit 130, so that the scattered light may only be introduced to the spectroscopy unit 140. The long-pass filter may be configured to remove primary light (excitation light) that is mixed in secondary light (scattered light) so that only scattered light scattered from the underwater 3 is received by the spectroscopy unit 140.

It is exemplified that the cap 150 has any one shape selected from a bell, a cup, and a dome having an opening on one side, but the shape of the cap 150 is not limited thereto. For example, the cap 150 may be in the form of a rectangular box with an opening on one side. The sensing unit 110 may be received within the inside of the cap 150, and the cap 150 may have an air layer within the inside to prevent suspended substances from adhering to the sensing unit 110 housed within the cap 150.

The cap 150 may be formed of a material, such as a metal or plastic, that is resistant to denaturation or corrosion due to deformation or contaminant in an underground environment, and the cap 150 may be formed with a weight or more of a set weight to be lowered without shaking to prevent the cap 150 from tipping over or prevent suspended substances from adhering to the focusing optics 112. Furthermore, the cap 150 may be prevented from being submerged at an angle, or from tipping or falling over while being submerged when the cap 150 is introduced into the underwater 3, thereby preventing the air layer located inside the cap 150 from escaping from the inside of the cap 150 when the cap 150 is introduced into the underwater 3.

In this case, the end of the cap 150 defining the opening may be formed to protrude further than the sensing unit 110 so that the sensing unit 110 is located within the air layer. As a result, the focusing optics 112 may be located within the air layer, the focal point f focused by the focusing optics 112 may be located in the underwater 3, and the edge of the cap 150 defining the opening may be located between the focusing optics 112 and the focal point f focused by the focusing optics 112.

When the air layer located inside the cap 150 is reduced by water pressure, the optical probe device 100 may be lifted out of the underwater 3 environment by using the lifting device 10, the cap 150 may be refilled with air, and the optical probe device 100 may be submerged back into the underwater 3 environment.

Alternatively, the thickness of the air layer may be increased by increasing the distance between the end of the cap 150 and the focusing optics 112. This allows the air layer to be formed to surround the sensing unit 110 even when the air layer located inside the cap 150 is reduced by water pressure, thereby preventing suspended substances from adhering to the focusing optics 112.

In another exemplary embodiment, at least one sensor may be attached to the cap 150 and the air injection device 160 may be coupled to the cap 150 so that when air inside the cap 150 leaks, water is introduced into the cap 150, or the air inside the cap 150 is compressed, air may be injected into the inside of the cap 150 via the air injection device 160 without the need to take out the optical probe device 100 to the ground to prevent suspended substances from adhering to the focusing optics 112.

More specifically, the inside or exterior of the cap 150 may be coupled with at least one sensor selected from a first moisture detection sensor 151, a second moisture detection sensor 152, and a third moisture detection sensor 153, a sensing unit moisture detection sensor, and a water pressure detection sensor configured to detect moisture. The optical probe device may further include the air injection device 160 connected to the cap 150 and configured to inject air into the inside of the cap 150.

Referring to (a) of FIG. 2, an imaginary line passing through the focusing optics 112 is referred to as a focusing optics imaginary line 112', an imaginary line passing through the plurality of first moisture detection sensors 151 is referred to as a first moisture detection sensor imaginary line 151', an imaginary line passing through the plurality of second moisture detection sensors 152 is referred to as a second moisture detection sensor imaginary line 152', and an imaginary line passing through the plurality of third moisture detection sensors 153 is referred to as a third moisture detection sensor imaginary line 153'.

The first moisture detection sensor 151 may be provided at a position spaced by a preset distance inwardly from the distal end of the cap 150 that protrudes forwardly more than the focusing optics 112 to detect water that has filled the inside of the cap 150. More specifically, the first moisture detection sensor 151 may be positioned between the third moisture detection sensor imaginary line 153' and the focusing optics imaginary line 112'.

As a result, when moisture is detected by the first moisture detection sensor 151, the air injection device 160 may inject air according to a first set value to increase the thickness of the air layer to push the water filled inside the cap to the underwater so that the water inside the cap is located below the first moisture detection sensor imaginary line 151'. Alternatively, when moisture is detected by the first moisture detection sensor 151, the cap 150 and the sensing unit 110 may be taken out into the air 1 by using the lifting device 10 to replenish the air layer within the cap 150.

The second moisture detection sensor 152 may be provided on an inner wall of the cap 150, which is positioned between the focusing optics 112 and the first moisture detection sensor 151, and may be configured to detect water that fills the water level at which the first moisture detection sensor 151 is positioned or more. More specifically, the second moisture detection sensor 152 may be positioned between the first moisture detection sensor imaginary line 151' and the focusing optics imaginary line 112'.

When moisture is detected by the second moisture detection sensor 152, the air injection device 160 may be configured to inject air according to a second set value that is greater than the first set value. In this case, the first set value and the second set value may include at least one of an air injection volume and an injection time. This may cause the water inside the cap to be located below the first moisture detection sensor imaginary line 151' when the air is injected. Alternatively, when moisture is detected by the second moisture detection sensor 152, the cap 150 and the sensing unit 110 may be taken out into the air 1 by using the lifting device 10 to replenish the air layer within the cap 150.

When moisture is detected by the first moisture detection sensor 151 or the second moisture detection sensor 152, air is injected from the air injection device 160, the volume of the air layer inside the cap 150 is increased, and the water injected into the cap 150 may be moved to the outside of the cap 150. When the air layer fills to the distal end of the cap 150, at least a portion of the air in the air layer may be discharged from the cap 150, and the bubbled air may push out suspended substances, such as surface organic carbon, that were in contact with the air layer. In this case, the first moisture detection sensor 151 and the second moisture detection sensor 152 may measure the inflow of water step by step, and quickly and precisely inject air when the flow of water increases to prevent suspended substances and water from contacting the focusing optics 112.

In another exemplary embodiment, the optical probe device may further include a moisture detection sensor (not illustrated) coupled to the sensing unit 110 and configured to detect moisture. In this case, the moisture detection sensor may be preferably disposed at a front end of the sensing housing 113 located in front of the focusing optics 112. When moisture is detected by the sensing unit moisture detection sensor, the air injection device 160 may rapidly inject air according to a predetermined set value to increase the thickness of the air layer inside the cap 150 to push the water filled inside the cap into the underwater to prevent water from being in contact with the focusing optics 112. In this case, the set value may include at least one of an air injection volume and an injection time. This may push the filled water below the first moisture detection sensor imaginary line 151' to prevent water from penetrating the sensing unit 110. Alternatively, when moisture is detected by the sensing unit moisture detection sensor, the cap 150 and the sensing unit 110 may be taken out into the air 1 by using the lifting device 10 to replenish the air layer within the cap 150.

(a) of FIG. 2 is a conceptual view of the optical probe device 100 located in the air 1, and (b) of FIG. 2 is a conceptual view of the optical probe device 100 located underwater 3.

As illustrated in (a) of FIG. 2, when the optical probe device 100 located in the air 1 is introduced into the underwater 3, the optical probe device 100 may be introduced with an air layer inside the cap 150, as illustrated in (b) of FIG. 2. In this case, some water in the underwater 3 may be introduced into the cap 150, and when the introduced water is located above the first moisture detection sensor imaginary line 151', air may be injected into the cap 150 through the air injection device 160 to push the water introduced into the cap 150 out of the cap so that the water is located below the first moisture detection sensor imaginary line 151'.

The cap 150 may further include a shutter 155 for opening and closing an opening in the cap 150, and a water pressure detection sensor 154 installed in the cap 150 and configured to detect water pressure.

Figure 3:
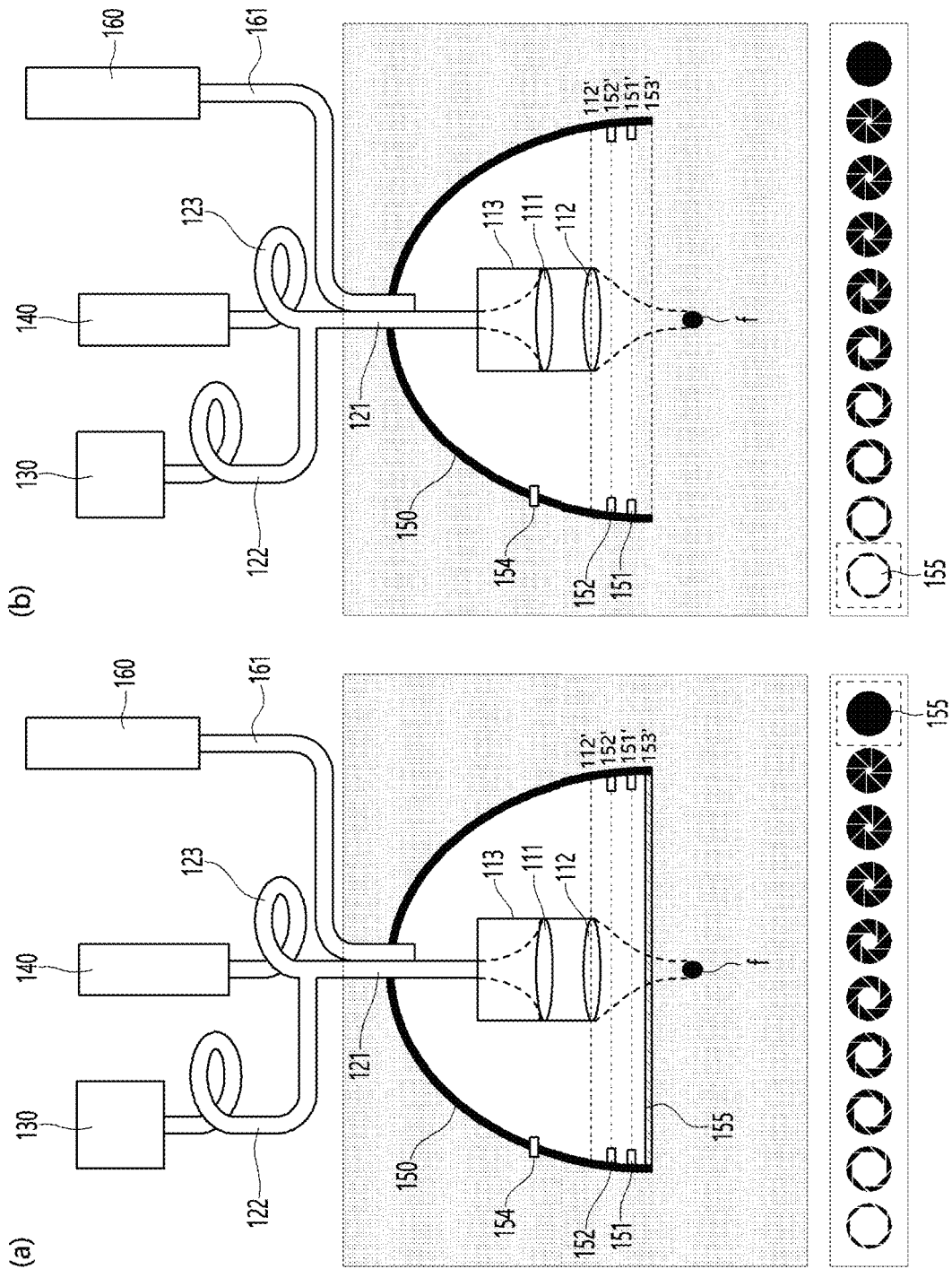
FIG. 3 is a conceptual diagram of the optical probe device including a shutter.

FIG. 3 is a conceptual diagram illustrating the optical probe device 100 including the shutter 155. (a) of FIG. 3 is a schematic diagram illustrating the case where the shutter 155 closes the cap 150 when the optical probe device 100 is penetrated into the underwater 3, and (b) of FIG. 3 is a schematic diagram illustrating the case where the shutter 155 opens the cap 150 when the optical probe device 100 measures the underwater 3 environment.

The shutter 155 may be installed on the cap 150 and configured to open or close an opening in the cap 150. The shutter 155 may be configured to remain closed while trapping a layer of air within the inside of the cap 150 prior to being submerged in the underwater 3, and then open after being submerged in the underwater 3 and reaching a target point.

As illustrated in (a) of FIG. 3, when the optical probe device 100 is penetrated into the underwater 3, the shutter 155 may close the opening of the cap 150 to prevent water and suspended substances in the underwater from being introduced into the cap 150, and to prevent air inside the cap 150 from escaping to the outside. As illustrated in (b) of FIG. 3, the shutter 155 may be opened to measure the underwater 3 environment of the optical probe device 100 after completion of the penetration into the underwater 3, so that the focal point f focused by the focusing optics 112 may measure the substance in the underwater 3.

At least three third moisture detection sensors 153 may be formed at the distal end of the cap 150, and in the plurality of third moisture detection sensors 153, a distance between one third moisture detection sensor 153 and another third moisture detection sensor 153 and a distance between another third moisture detection sensor 153 and still another third moisture detection sensor 153 may be the same. When moisture is detected simultaneously by the three third moisture detection sensors 153, it may be determined that the water surface 2 and the cap 150 are parallel and that the distal end of the cap 150 is in contact with the water surface 2. This may prevent the cap 150 from being tilted and penetrated into the underwater 3. The third moisture detection sensor 153 may be configured to detect whether the cap 150 is in contact with the water surface 2.

In one exemplary embodiment, when the third moisture detection sensor 153 detects that the cap 150 is in contact with the water surface 2, the cap 150 may be raised by a preset distance so that the sensing unit 110 detects the substance on the water surface 2. In another exemplary embodiment, the sensing unit 110 may be raised by a preset distance to detect the substance on the water surface 2 when the third moisture detection sensor 153 detects that the cap 150 has been in contact with the water surface 2.

Figure 4:
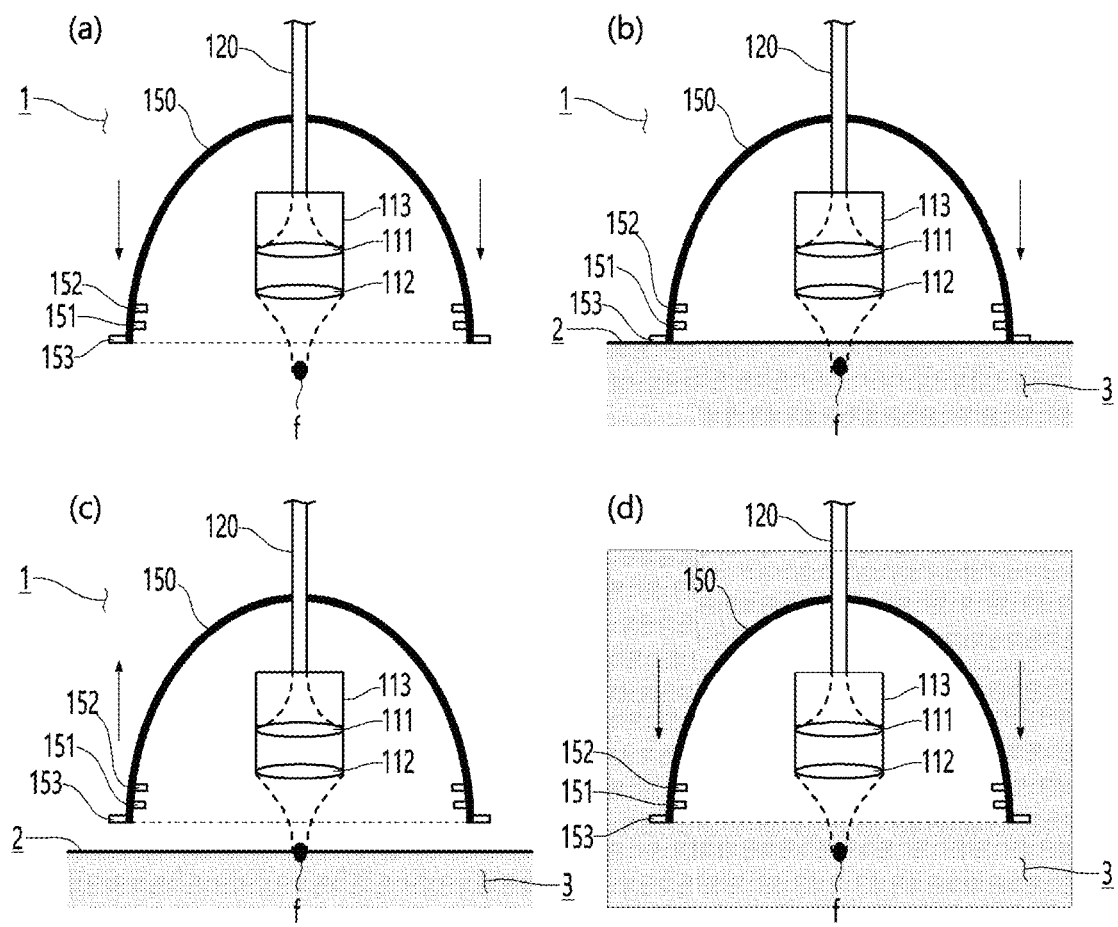
FIG. 4 is a conceptual diagram illustrating the movement of an optical probe for measuring Non-Aqueous Phase Liquid (NAPL) in a water surface by using the lifting device.

FIG. 4 is a conceptual diagram illustrating the movement of the optical probe to measure suspended substances, such as NAPL, on the water surface 2 by using the lifting device 10. (a) in FIG. 4 is a schematic diagram illustrating the cap 150 being lowered by the lifting device 10, (b) in FIG. 4 is a schematic diagram illustrating the third moisture detection sensor 153 detecting that the cap 150 has been in contact with the water surface 2, (c) in FIG. 4 is a schematic diagram illustrating the cap 150 being raised by a preset distance, and (d) in FIG. 4 is a schematic diagram illustrating the cap 150 being submerged in the underwater 3.

In one exemplary embodiment, the lifting device 10 may be configured to be raised by a preset distance so that the sensing unit 110 detects the substance on the water surface 2 when the water surface 2 is detected by the third moisture detection sensor 153, and to be lowered so that the sensing unit 110 is submerged in the underwater 3 and reaches a target point after detecting the substance on the water surface 2.

When the cap 150 is lowered by the lifting device 10 as illustrated in (a) of FIG. 4, and then the cap 150 is in contact with the water surface 2 as illustrated in (b) of FIG. 4, the third moisture detection sensor 153 may measure the moisture. In this case, the focal point f focused by the focusing optics 112 may be positioned in the underwater 3, and the operation of the lifting device 10 may be temporarily stopped when moisture is measured by the third moisture detection sensor 153. The cap 150 is then raised by the preset distance, as illustrated in (c) of FIG. 4, and the focal point f focused by the focusing optics 112 may be positioned on the water surface 2. As a result, the focal point f and the water surface 2 are aligned, so that the sensing unit 110 may easily measure suspended substances, such as Nonaqueous Phase Liquids (NAPL) on the water surface 2. The preset distance is a distance between the water surface 2 and the focal point f of the sensing unit 110, and may be formed differently depending on the length of the focal point f of the sensing unit 110. Then, after a period of time, as illustrated at (d) in FIG. 4, the lifting device 10 may be reactivated to submerge the sensing unit 110 in the underwater 3 so that the sensing unit 110 may measure the underwater 3. As a result, when the water surface 2 and the cap 150 are in contact, the position of the cap 150 may be temporarily adjusted so that the suspended substances, such as NAPL, on the water surface 2 and the suspended substances in the underwater 3 may be measured at once.

Figure 5:
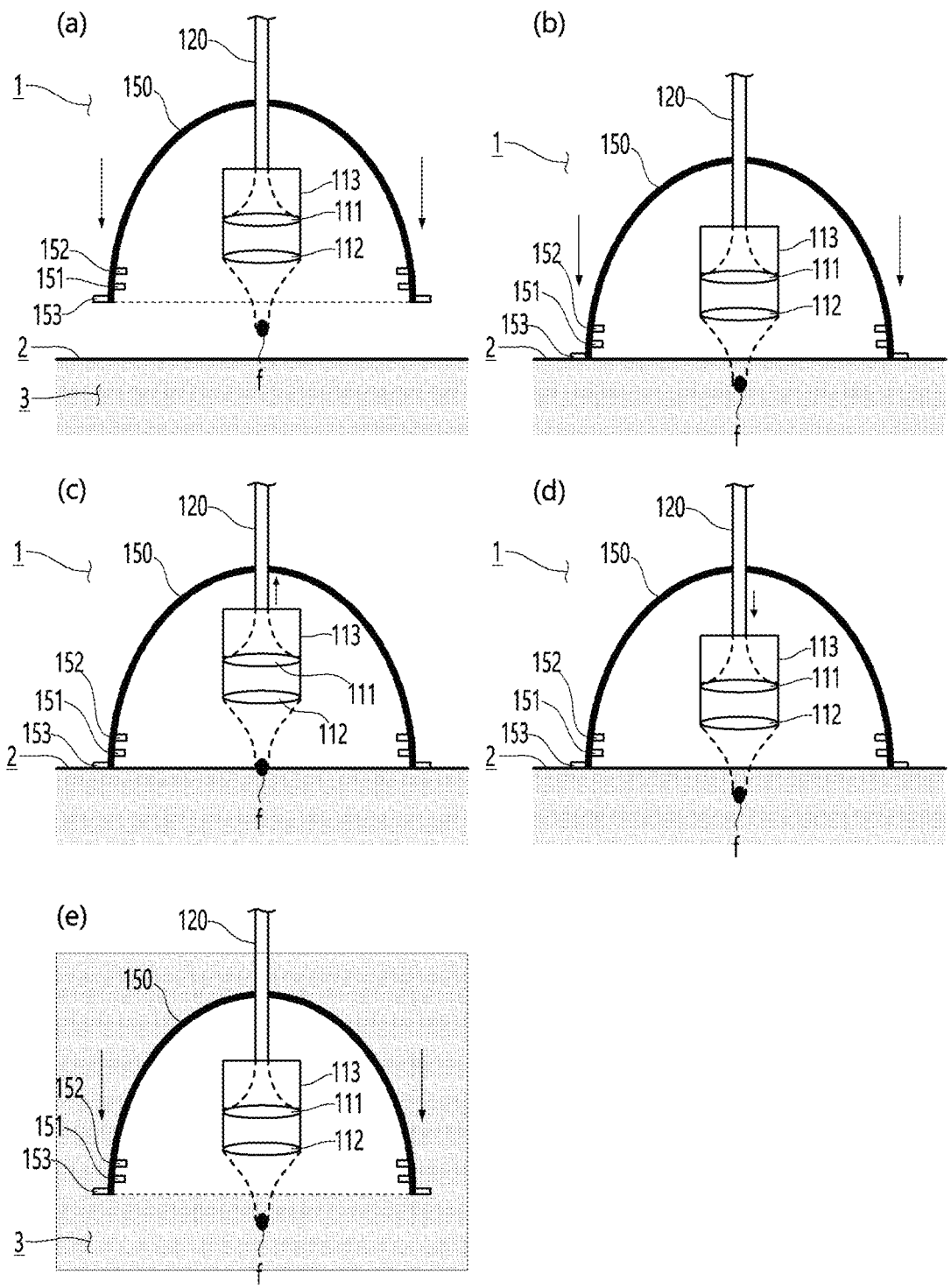
FIG. 5 is a conceptual diagram illustrating the movement of a sensing unit 110 that measures NAPL in a water surface by moving the sensing unit 110.

FIG. 5 is a conceptual diagram illustrating the movement of the sensing unit 110 to measure NAPL on the water surface 2 by moving the sensing unit 110. (a) in FIG. 5 is a schematic diagram illustrating the cap 150 being lowered by the lifting device 10, (b) in FIG. 5 is a schematic diagram illustrating the third moisture detection sensor 153 detecting that the cap 150 has been in contact with the water surface 2, (c) in FIG. 5 is a schematic diagram illustrating the sensing unit 110 being raised by a preset distance, (d) in FIG. 5 is a schematic diagram illustrating the sensing unit 110 being lowered by a preset distance, and (e) in FIG. 5 is a schematic diagram illustrating the cap 150 being submerged in the underwater 3.

In another exemplary embodiment, the sensing unit 110 may be configured to rise a preset distance to detect substances on the water surface 2 when the water surface 2 is detected by the third moisture detection sensor 153, and after the sensing unit 110 detects the substance on the water surface 2, the sensing unit 110 may be configured to be submerged in the underwater 3 and lowered to reach a target point.

When the cap 150 is lowered by the lifting device 10 as illustrated in (a) of FIG. 5, and then the cap 150 is in contact with the water surface 2 as illustrated in (b) of FIG. 5, the third moisture detection sensor 153 may measure moisture, and when the moisture is measured by the third moisture detection sensor 153, the operation of the lifting device 10 may be temporarily stopped. In this case, the focal spot f focused by the focusing optics 112 may be located in the underwater 3. Then, as illustrated in (c) of FIG. 5, the sensing unit 110 is raised by the preset distance, and the focal point f focused by the focusing optics 112 may be positioned on the water surface 2, so that the sensing unit 110 may easily measure suspended substances, such as NAPL, on the water surface 2. The preset distance is a distance between the water surface 2 and the focal point f of the sensing unit 110, and may be formed differently depending on the length of the focal point f of the sensing unit 110. Then, in (d) of FIG. 5, after the sensing unit 110 has completed the measurement of the suspended substances, such as NAPL, on the water surface 2, the sensing unit 110 may be lowered again to position the focal point f focused by the focusing optics 112 to face the underwater 3. After a period of time, as illustrated at (e) in FIG. 5, the lifting device 10 may be reactivated to submerge the sensing unit 110 into the underwater 3 so that the sensing unit 110 may measure the underwater 3. As a result, when the water surface 2 and the cap 150 are in contact, the position of the cap 150 may be temporarily adjusted to measure both NAPL on the water surface 2 and suspended substances in the underwater 3.

The water pressure detection sensor 154 may be installed in the cap 150 and configured to detect water pressure. The water pressure detection sensor 154 may be configured to inject air into the inside of the cap 150 before the shutter 155 is opened by the air injection device 160 when the shutter 155 is closed and the optical probe device 100 is lowered and moved into the ground and the ambient water pressure increases such that the water pressure detected by the water pressure detection sensor 154 is greater than a preset value. This prevents the sensing unit from being contaminated due to air being compressed by the increase of the water pressure when the optical probe device is submerged a certain depth or more.

Furthermore, the water pressure detection sensor 154 may measure the water pressure in the ground when the optical probe device 100 is submerged in the underwater 3, the shutter 155 is opened, and the optical probe device 100 is transmitted up and down in the underwater 3 and then moved to the ground where the water pressure is high. As a result, the thickness of the air layer is increased by injecting air into the cap 150 by using the air injection device 160 as much as the air compressed by the water pressure, and thus the air is compressed when the water pressure is increased, so that the air layer becomes thinner, and the sensing unit is located in the underwater 3, thereby preventing contamination by suspended substances, and the like.

The air injection device 160 receives a measurement value from one or more sensors selected from the first moisture detection sensor 151, the second moisture detection sensor 152, the third moisture detection sensor 153, the sensing unit moisture detection sensor, and the water pressure detection sensor 154, and may inject air into the inside of the cap based on the measurement value to push out suspended substances that are attempting to penetrate the cap 150 with air and bubbles or the like. The air injection device 160 may further include the air injection line 161 having one end coupled to the air injection device 160 and the other end formed to penetrate the cap 150. As a result, the air injection device 160 compresses air when the measurement value is equal to or greater than a set value, and the compressed air may be moved along the air injection line 161 and injected into the inside of the cap 150.

Figure 6:
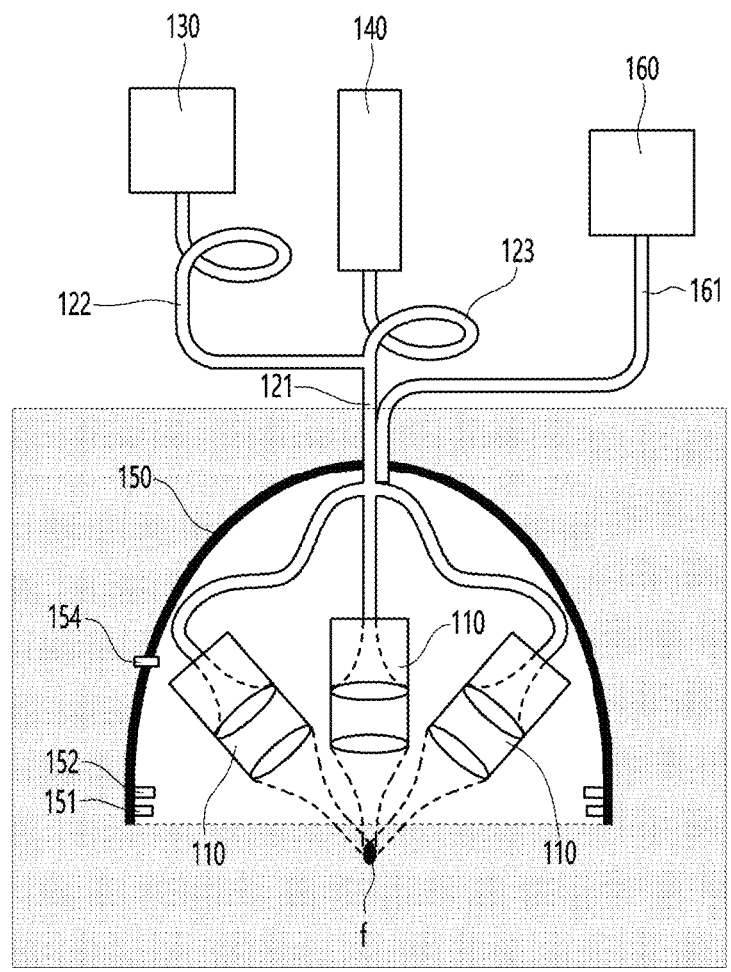
FIG. 6 is a conceptual diagram illustrating the optical probe including a plurality of sensing units 110 and measuring one point.
Figure 7:
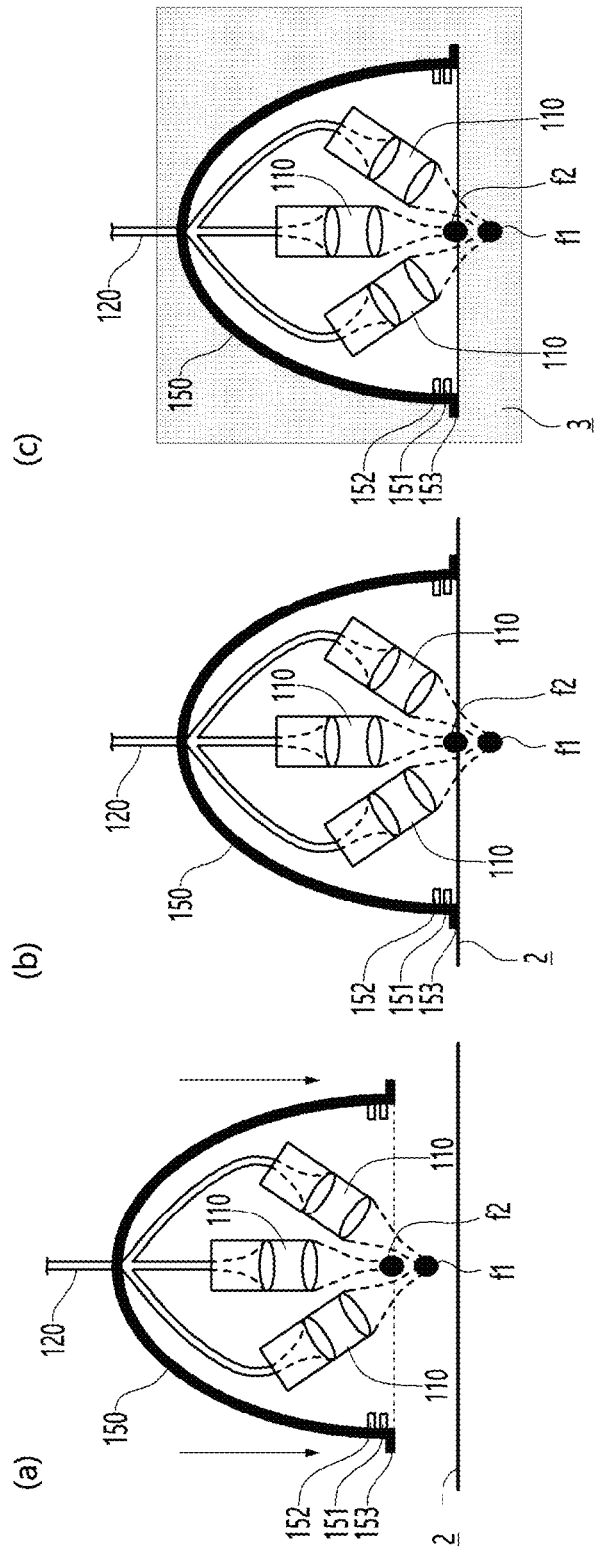
FIG. 7 is a conceptual diagram illustrating a method for measuring NAPL in a water surface by using the optical probe including the plurality of sensing units 110.
Figure 8:
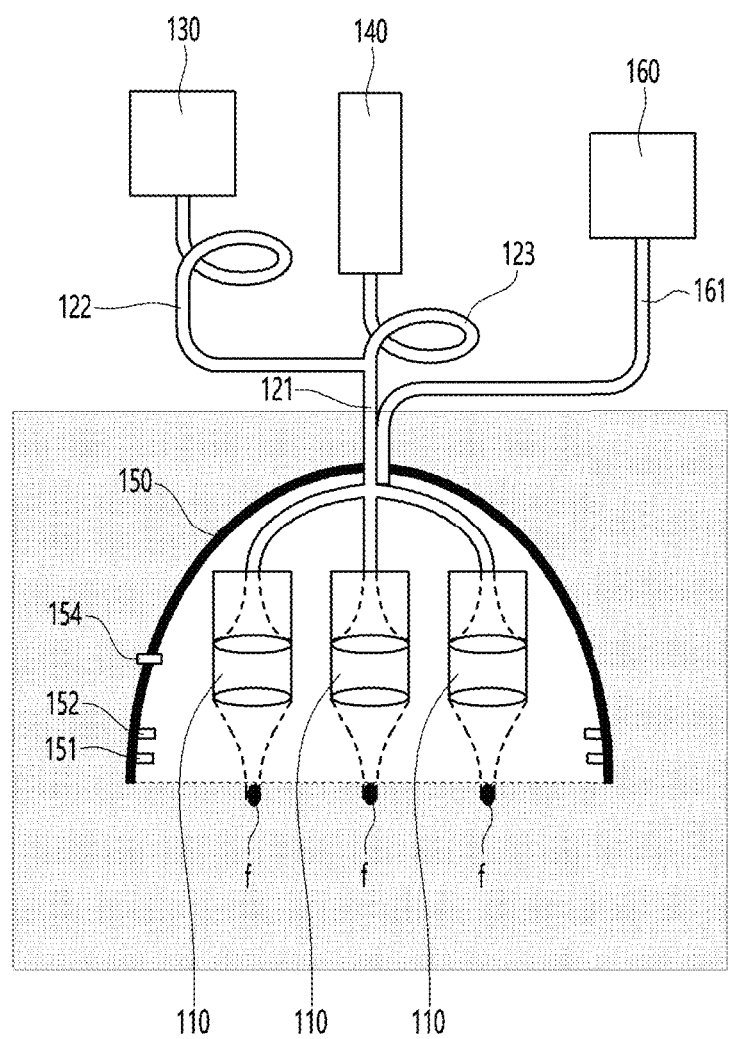
FIG. 8 is a conceptual diagram illustrating the optical probe including the plurality of sensing units 110 and measuring multiple points.

FIG. 6 is a conceptual diagram illustrating the optical probe including a plurality of sensing units 110 and measuring one point, FIG. 7 is a conceptual diagram illustrating a method for measuring NAPL on a water surface 2 by using the optical probe including the plurality of sensing units 110, and FIG. 8 is a conceptual diagram illustrating the optical probe including the plurality of sensing units 110 and measuring multiple points.

As illustrated in FIGS. 6 to 8, the plurality of sensing units 110 may be provided. In this case, the plurality of sensing units 110 is simply provided, and the lifting device 10, the first moisture detection sensor 151, the second moisture detection sensor 152, the third moisture detection sensor 153, a water pressure sensor, the air injection device 160, and the shutter 155, and the like may be applied identically to the single sensing unit 110.

In one exemplary embodiment, as illustrated in FIG. 6, the plurality of sensing units 110 may be provided, and the focal points f focused by at least two or more sensing units 110 may be converged to form a single point so that each of the at least two or more sensing units 110 analyzes the component of the substance in the underwater 3 for the same point in time. This allows a single focal point f to be measured by the plurality of sensing units 110, thereby increasing the sensitivity of the measurement and facilitating the analysis of the component of the substance present in the underwater 3.

(a) of FIG. 7 is a schematic diagram illustrating the cap 150 being lowered by the lifting device 10, (b) of FIG. 7 is a conceptual diagram illustrating one sensing unit 110 measuring suspended substances, such as NAPL, on the water surface 2, and (c) of FIG. 7 is a conceptual diagram illustrating the remaining sensing unit 110 measuring the underwater 3.

As illustrated in FIG. 7, a focal point $f_2$ of one of the sensing units 110 among the plurality of sensing units 110 may be formed at the same height as the imaginary line 153' of the third moisture detection sensor, which is the edge of the cap 150, and a focal point $f_1$ of the remaining sensing units 110 may be formed as a single point below the edge of the cap 150.

As illustrated in (a) of FIG. 7, when the optical probe device 100 is lowered downwardly by the lifting device 10 and then the third moisture detection sensor 153 is in contact with the water surface 2 as illustrated in (b) of FIG. 7, the lifting device 10 may stop. In this case, the focal point $f_2$ of the one sensing unit 110 is formed at the same height as the imaginary line 153' of the third moisture detection sensor, which is the edge of the cap 150, so that the one sensing unit 110 may easily measure suspended substances, such as NAPL, on the water surface 2 without the need to move the optical probe device 100 or the sensing unit 110. After measuring the NAPL on the water surface 2, as illustrated in (c) of FIG. 7, the lifting device 10 may be operated to introduce the optical probe device 100 into the underwater 3 to facilitate measurement of the underwater substances, and the like.

As a result, when the water surface 2 is measured by the third moisture detection sensor 153, it is possible to measure suspended substances, such as NAPL, on the water surface 2 through one sensing unit 110 and measure the underwater 3 through the remaining sensing units 110 by submerging the sensing unit 110 and the cap 150 in the underwater 3, without having to separately adjust the position of the cap 150 or adjust the position of the sensing unit 110.

In still another exemplary embodiment, as illustrated in FIG. 8, the plurality of sensing units 110 may be provided, and the focal point f focused through the plurality of sensing units 110 may be formed differently so that each of the plurality of sensing units 110 analyzes the components of the substance in the underwater 3 for different points within a predetermined area corresponding to the cap 150. As a result, after the plurality of sensing units 110 measure the underwater 3, the measurement values may be averaged to facilitate analysis of the component of the substance present in the underwater 3 when the homogeneity of the underwater 3 decreases.

In this case, the focal point f of one sensing unit 110 of the plurality of sensing units 110 may be formed at the same height as the edge of the cap 150, and the focal point f of the remaining sensing units 110 may be formed below the edge of the cap 150, so that NAPL on the water surface 2 and the underwater 3 may be measured through one sensing unit 110 without the need to separately adjust the position of the cap 150 or adjust the position of the sensing units 110.

REFERENCE NUMERALS

1: Atmosphere
2: Water surface
3: Underwater
10: Lifting device
11: Cable
12: Pulley
13: Drum
100: Optical probe device
110: Sensing unit
111: Collimator
112: Focusing optics
113: Sensing housing
120: Light transmitting unit 121: Transmission optical fiber
122: Light source optical fiber
123: Spectroscopic optical fiber
130: Light source unit
140: Spectroscopy unit
150: Cap
151: First moisture detection sensor
152: Second moisture detection sensor
153: Third moisture detection sensor
154: Water pressure detection sensor
155: Shutter
160: Air injection device
161: Air injection line

What is claimed is:

1. An optical probe device for analyzing a component of an underwater substance, the optical probe device comprising:
a light source configured to emit excitation light;
a sensor configured to emit the excitation light into underwater and collect scattered light scattered from the underwater;
a spectrometer configured to analyze the scattered light;
an optical fiber assembly configured to connect the light source to the sensor, and the sensor to the spectrometer; and
a cap having an opening on one side, configured to receive the sensor therein, and configured to allow an air layer inside the opening to separate the sensor from an underwater environment when the opening is lowered and submerged in the underwater in a state where the opening is disposed to cover a water surface;
wherein the sensor includes:
a collimator configured to convert the excitation light into parallel light, and to collect the scattered light; and
a focusing optics disposed in front of the collimator and configured to collect the parallel light converted by the collimator and to convert the scattered light scattered underwater into parallel light, and
wherein:
an edge of the cap defining the opening is located between the focusing optics and a focal point focused by the focusing optics;
a water surface detection sensor provided at a distal end of the cap and configured to detect whether the cap has been in contact with a water surface; and
the sensor rises by a preset distance to detect a substance on the water surface when the water surface detection sensor detects that the cap is in contact with the water surface.

2. The optical probe device of claim 1, further comprising:
an air injector connected to the cap and configured to inject air into an inside of the cap.

3. The optical probe device of claim 2, further comprising:
a first moisture detection sensor spaced inwardly from a distal end of the cap protruding forwardly from the focusing optics by a preset distance to detect water that has filled an inside of the cap,
wherein the air injector is configured to inject air according to a first set value when moisture is detected by the first moisture detection sensor.

4. The optical probe device of claim 3, further comprising:
a second moisture detection sensor provided on an inner wall of the cap positioned between the focusing optics and the first moisture detection sensor and configured to detect water filled a water level above at which the first moisture detection sensor is positioned or more,
wherein the air injector is configured to inject air according to a second set value greater than the first set value when moisture is detected by the second moisture detection sensor, and
wherein the first set value and the second set value include at least one of an air injection volume and an injection time.

5. The optical probe device of claim 2, further comprising:
a moisture detection sensor disposed at a front end of the sensor positioned in front of the focusing optics and configured to detect moisture,
wherein the air injector injects air when moisture is detected by the moisture detection sensor.

6. The optical probe device of claim 1, further comprising:
a shutter installed on the cap and configured to open and close an opening in the cap, wherein the shutter is configured to remain closed to trap an air layer inside the cap before being submerged underwater, and to open after being submerged underwater and reaching a target point.

7. The optical probe device of claim 6, further comprising:
a water pressure detection sensor installed in the cap and configured to detect water pressure; and
an air injection device connected to the cap and configured to inject air into an inside of the cap before the shutter is opened when a water pressure detected by the water pressure detection sensor is greater than a preset value.

8. The optical probe device of claim 1, wherein a plurality of units sensors is provided, and focal points focused through the plurality of the sensors are different so that each of the plurality of sensors analyzes components of underwater substances for different points within a predetermined region corresponding to the cap.

9. The optical probe device of claim 1, wherein a plurality of sensors is provided, and focal points focused through at least two sensors among the plurality of sensors are the same so that each of the two sensors analyzes components of underwater substances for the same one point.

10. A method of performing a component analysis of an underwater substance by using the optical probe device for analyzing the component of the underwater substance according to claim 1.

11. An optical probe system for analyzing a component of an underwater substance, the optical probe system comprising:
the optical probe device according to claim 1, configured to perform a component analysis of an underwater substance; and
a pulley system configured to move the optical probe device up and down so as to take the optical probe device out of the water and then submerge the optical probe device in underwater.

12. The optical probe system of claim 11, wherein the pulley system rises by a preset distance such that the sensor detects a substance on a water surface when the water surface is detected by the water surface detection sensor, and the sensor is submerged in underwater and is lowered to reach a target point after detecting the substance on the water surface.

* * * * *